Sept. 27, 1966  K. H. A. E. FABER  3,274,863
CHIP CUTTING ROTARY DRILL
Filed Nov. 1, 1965  2 Sheets-Sheet 1
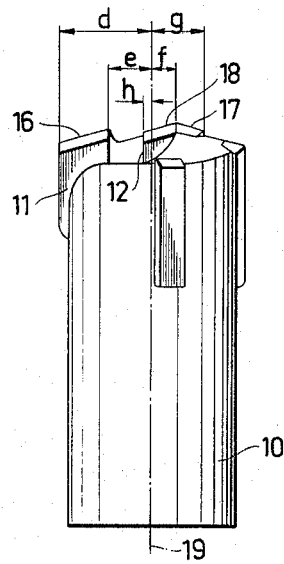
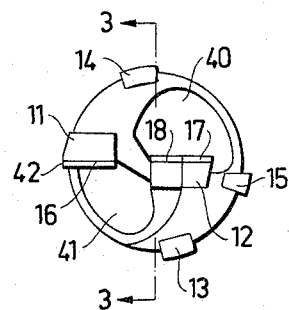
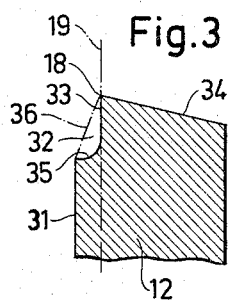
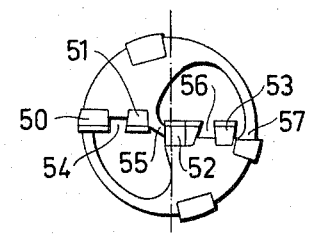
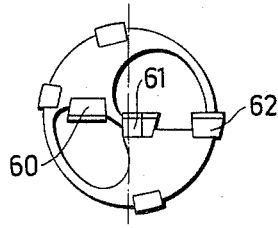
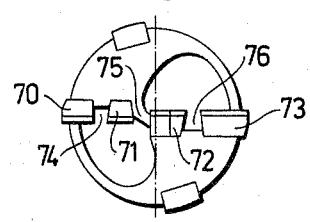

Fig. 7 Fig. 8
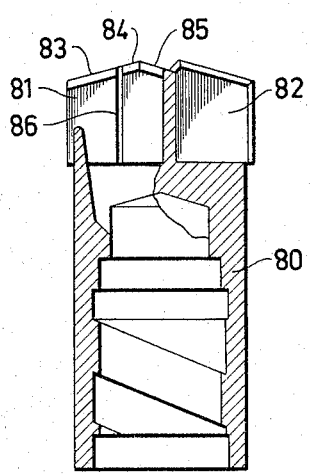
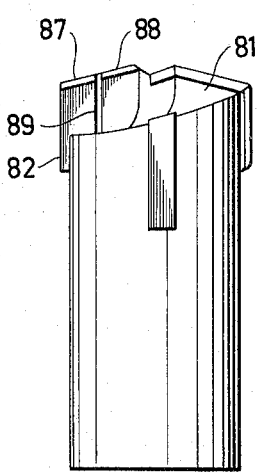
Fig. 10 Fig. 9
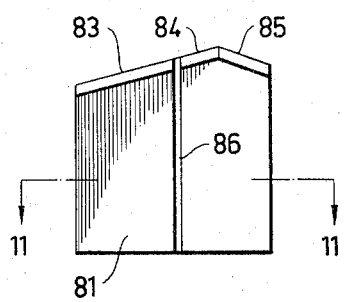
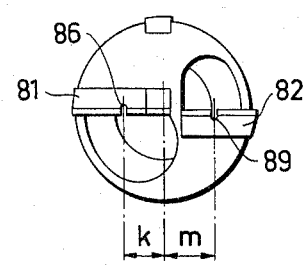
Fig. 11
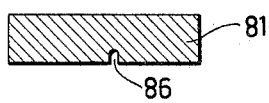

United States Patent Office 3,274,863
Patented Sept. 27, 1966

3,274,863
CHIP CUTTING ROTARY DRILL
Kurt Heinrich Albert Erich Faber, Sandviken, Sweden, assignor to Sandvikens Jernverks Aktiebolag, Sandviken, Sweden, a corporation of Sweden
Filed Nov. 1, 1965, Ser. No. 505,724
Claims priority, application Sweden, Apr. 12, 1962, 4,068/62; Jan. 22, 1963, 672/63
16 Claims. (Cl. 77—67)

This application is a continuous-in-part of my application Serial No. 271,054 filed April 8, 1963 and now abandoned.

The present invention relates to a chip cutting rotary drill having at least two cutting edges placed in spaced angular direction around the drilling axis.

It is known in connection with rotary drills to have a cutting insert with a main cutting edge extending from the periphery towards the drilling axis and a secondary, central cutting edge passing through said axis. This arrangement of the cutting edges results in an eccentric force causing the drill to exert a great pressure on the inside of the hole thereby deforming the wall of the hole. It is also known to have two symmetrical main cutting edges and a secondary cutting edge in the centre but the chip flow then often becomes so great and the chips so broad that the removal of the chips, especially in tube shaped drills, becomes a problem. The present invention solves this problem by using shorter cutting edges and spacing them in such a way around the periphery that the chip removal is facilitated at the same time as the resulting sideward force is kept relatively small. Another advantage of the invention is that the resharpening of the drill is facilitated in comparison with earlier known drills, which in order to cleave the chips have had the cutting edge divided into separate adjacent steps.

The purpose of the invention is achieved by arranging the cutting edges in opposite directions so that each generates only a part of the surface which forms the bottom of the drill hole. In its simplest form this drill has two main cutting edges comprising each a single cutting edge portion, said cutting edges being in the main diametrically opposite to each other, the drill also having a secondary cutting edge in the centre. The cutting edges cover each only a zone of the rotation surface in such a way that the zones together form the whole rotation surface. The main cutting edges can also be subdivided and be arranged in two oppositely positioned groups of cutting edge portions, the spaces between the zones generated by the cutting edges in one group being covered by the cutting edges in the other group.

The invention will be described below with aid of the enclosed drawings wherein:

FIG. 1 is a side elevational view illustrating the improved drill.

FIG. 2 is an end elevational view of the drill shown in FIG. 1,

FIG. 3 is a section of the cutting insert taken on line 3—3 of FIG. 2 shown on an enlarged scale.

FIG. 4 is an end elevational view of a modification of the drill having four cutting inserts, FIG. 5 is an end elevational view of a further modification of the drill having three cutting inserts, FIG. 6 is an end elevational view of a further modification of the drill having four cutting inserts, FIG. 7 is a longitudinal section of a further modification of the drill, FIG. 8 is a side elevational view of the drill shown in FIG. 7, FIG. 9 is an end elevational view of the drill shown in FIG. 7, FIG. 10 is a side elevational view on an enlarged scale of one of the cutting inserts in the drill shown in FIG. 7.

FIG. 11 is a section taken on line 11—11 of FIG. 10.

The drill shown in FIG. 1 comprises a shank portion 10 in the form of a sleeve adapted to be connected to a rotating drill shaft. The drill can be stationary and instead the work piece rotate. The portion 10 is hollow in order that the chips can be removed through its inside. At the front part of the drill are two cutting inserts 11 and 12, which preferably are made of sintered hard material as e.g. sintered carbide or sintered oxides. For guiding of the drill guiding ridges 13, 14 and 15 are provided, which also preferably are made of sintered hard material. In some cases hard steel can be used in the cutting inserts and the guiding ridges. The insert 11 has a cutting edge 16 extending from the periphery of the drill at a distance $d$ from the centre and terminating at a distance $e$ from the centre. The insert 12 has a cutting edge 17 which does not extend to the periphery and has its outer end situated at a distance $g$ and its inner end at a distance $f$ from the centre. The distance $e$ is equal to or somewhat smaller than the distance $g$ in order that the cutting zone of the edge 17 forms a continuation of the cutting zone of the edge 16, possibly with a small overlapping between the zones in order to ensure that an uninterrupted surface is generated. The edges 16 and 17 are the main cutting edges. The centre of the hole is cut out by the central, secondary cutting edge 18 which ends at or extends somewhat beyond the centre line 19 by a distance $h$. The cutting edges 16 and 17 are shown inclined and situated along the same conical rotation surface, the edge 18 being inclined in the opposite direction. Generally the edges 16 and 17 should be situated along a continuous surface but it is, however, possible for the cutting edge 17 to be situated in front of the edge 16, so that the generated surface is divided into two steps. It is not necessary that the edges are directed straight through the centre line 19 but they may be directed obliquely in relation to a plane through the edges containing the axis 19. The cutting edges 16 and 17 can also be perpendicular to the drilling axis 19, but the cutting edge 18 should preferably be directed rearwardly towards the centre in order to insure the best possible cutting ability at the centre.

FIG. 3 is an enlarged cross section through the central cutting edge on line 3—3 of FIG. 2. The other cutting edges can have the same cross section. The cutting insert 12 is, at its front surface 31, provided with a recess 32 situated along the cutting edge 18. This recess serves the purposes of deflecting and breaking the chips. The recess has a chip surface 33 with a rounded portion 35 at its bottom. Behind the cutting edge there is a release surface 34, which is rearwardly inclined in relation to the drilling direction.

It has been found important that the central cutting edge 18 extends at least to the drilling axis 19 in order to have an effective and thorough cutting at the centre of the hole. In order to insure that the edge 18 may pass through and beyond the axis by the distance $h$ as earlier described and shown in FIG. 1. When the insert is resharpened the surface 34 and 35 are ground rearwardly in relation to the drilling direction, and the cutting edge still goes through the axis 19.

Along the central cutting edge 18 the surface 33 should be parallel with the drilling direction and contain the axis 19, but the recess 32 may be substituted by a beveling along the broken line 36. The surface 31 should be parallel with the axis and situated in front of the axis as shown in FIG. 3 in order to make possible that the cutting edge is maintained in its position through the axis after resharpening of the insert.

Along the cutting edges 16 and 17 the front surface 31 of the insert need not necessarily be parallel with the drilling direction. The front surface 31 may instead be inclined and provide a negative or positive rake angle.

The front surface of the drill is provided with openings 40 and 41 through which the chips can be removed. In tubular drills the chips pass to the internal cavity of the drill and in spiral drills they are removed along the spiral grooves.

The openings 40 and 41 should be large enough to permit an efficient removal of the chips and as illustrated in the figures they should preferably occupy a major part of a quadrant of the front surface situated adjacent each cutting edge in the direction of rotation. The guiding ridges 13, 14 are subjected to pressure and should in tubular drills preferably not be placed within the area weakened by said openings. In spiral drills they must of course be placed outside the chip openings. Therefore the guiding ridges are preferably placed outside said quadrants.

The guiding ridges 13, 14 and 15 are adapted to support the drill in lateral direction by a sliding contact with the wall of the drilled hole and are for this purpose made of a suitable material, usually sintered carbide, and are given a sufficient length and width to hold the specific surface pressure within permissible limits. Long hole drills are relatively slender, which results in a tendency to deviate from the desired direction. It is then important that the lateral contact with the drill hole actually is established at the guiding ridges, which are adapted for this purpose, and not somewhere else around the periphery of the drill head. In order to obtain a lateral resultant force with the desired direction and with a suitable size the cutting edges on both sides of are given suitable relative lengths. This provides a simple facility for establishing a lateral pressure at an arbitrary value from nought and upwardly. In this way the drill according to the invention can be adapted for drilling in such materials as for instance low carbon stainless steels which easily are welded to the guiding ridges by the pressure and therefore require a low specific pressure between the guiding ridges and the drilled hole.

As stated above the shape of the surface generated by the main cutting edges should be conical and also the shape of the surface generated by the secondary cutting edge should be conical. The main cutting edges should be inclined by equal angles in relation to the axis in order that the lateral forces in the plane of the cutting edges arising when the axial pressure acts upon the inclined edges compensate each other as much as possible. Equal inclinations of the main cutting edges has the further advantage that regrinding of the drill is facilitated. It is also suitable that the secondary cutting edge is inclined by the same angle as the main cutting edges and is parallel with the main cutting edge on the opposite side of the axis. The generated conical surfaces will then have the same tapering but in different directions.

FIG. 4 is a drill with four inserts 50, 51, 52 and 53, the main cutting edges thus each being divided into two separate portions. The space 54 between the inserts 50 and 51 and the space 55 between the insert 51 and the axis 19 leave two zones uncut, but these zones are cut by the inserts 53 and 52 respectively. The insert 52 carries the innermost main cutting edge portion together with a secondary cutting edge similar to the cutting edge 18 above. In the same way the inserts 50 and 51 cut along the zones left uncut at the space 56 between the inserts 52 and 53 and the space 57 between the insert 53 and the periphery. In order to insure a complete cutting the adjacent cutting zones can slightly overlap each other as stated above.

FIG. 5 shows a drill with three cutting inserts 60, 61 and 62 which in the same way as described above cut out adjacent circular zones of the whole generated surface.

FIG. 6 shows a drill with four inserts, where two of the inserts extend to the periphery. In this case the cutting zone of insert 70 falls completely within the cutting zone of insert 73. In the same way as described above the rotation zone of the space 74 is covered by the insert 73, the space 76 is covered by the insert 71 and the space 75 is covered by the insert 72.

The cutting edges in one direction from the axis may be situated on the same insert plate, or they may be situated on separate plates. If separate inserts are used for each cutting edge this implies the advantage that different carbide qualities can be used corresponding to the different cutting speeds of the inserts. The brazing joint will also have smaller internal stresses the smaller the joint is. On the other hand it may sometimes for other reasons be suitable to place the cutting edges on the same insert, which gives a rigid construction and an easy mounting of the inserts. In FIGS. 7–9 is shown a tubular drill 80 having two insert plates 81 and 82. The plate 81 has two main cutting edges 83 and 84, which are separated by a groove 86 in the insert, and a secondary cutting edge 85. The plate 82 has also two cutting edges 87 and 88 separated by a groove 89. The radial distance $k$ of the groove 86 is smaller than the radial distance $m$ of the groove 89, so that the rotation zone of the groove 86 is covered by the edge 88 and the rotation zone of the groove 89 is covered by the edge 83. The function of the groove is to divide the chips.

In FIG. 10 is shown the insert 81 separately and in FIG. 11 a section along the line 11—11 in FIG. 10.

By having main cutting edges which generate each a portion of the total generated surface the chips are narrower and easier to remove than the drills having main cutting edges covering the whole generated surface. By subdividing the main cutting edges into portions the width of the chips can be made arbitrarily small.

The illustrated drill can be modified and the same inserts be used for a spiral drill instead of the shown tubular drill.

The invention has in the foregoing been illustrated by drills having cutting inserts fastened by brazing, but especially in larger drills the inserts can be fastened by suitable clamping means.

I claim:

1. A chip cutting rotary drill for metal drilling comprising a shank portion and cutting inserts of sintered hard metal with two main cutting edges extending in opposite direction from the axis of the drill and adapted to generate a forwardly tapering frusto conical surface, said main cutting edges being adapted to generate adjacent annular zones of said frusto conical surface which at least touch each other, at the most a minor part of said zones overlapping each other, the drill further having a central secondary cutting edge which is situated on the same hard metal insert as at least one of the main cutting edges and adapted to generate a rearwardly tapering conical zone, the inner end of said secondary cutting edge extending at least to said axis, said main cutting edges and said secondary cutting edges being so positioned relative to each other that the forwardly tapering frusto conical surface generated by the former will at least touch the rearwardly tapering conical zone generated by the latter, all of said cutting edges being rectilinear and situated substantially in the same plane containing said axis and having front surfaces directed in the same direction as said axis, the total cutting edge length on each side of said axis being at least approximately equal.

2. Drill as defined in claim 1 in which one of said two main cutting edges is composed of two separate cutting edge portions separated by a space, the diametrically opposite main cutting edge having an annular rotary zone covering the rotary zone of said space, the rotary zones of the said two separate cutting edge portions being situated on each side of the rotary zone of the said diametrically opposite main cutting edge and at least touching said last named rotary zone, at the most a minor part of adjacent touching rotary zones overlapping each other.

3. Drill as defined in claim 1 in which both of the two main cutting edges are composed of at least two separate cutting edge portions, adapted to generate annular zones, the annular zones generated by one of the main cutting edges covering the zones which are not generated by the other main cutting edge, adjacent annular zones at least touching each other but not more than a minor part of the zones overlapping each other.

4. A chip cutting rotary drill for metal drilling comprising a shank portion and cutting inserts of sintered hard metal having two main cutting edges extending in opposite directions from the axis of the drill and positioned relative to said axis and to each other to cut annular zones of an outer, forwardly tapering frusto conical surface which at least touch each other with at most only a minor part of said zones overlapping each other, said drill further having a central secondary cutting edge situated on the same hard metal insert as at least one of said main cutting edges and positioned to cut an inner rearwardly tapering conical zone extending at least from the axis of said drill outwardly to said outer frusto conical surface.

5. A chip cutting rotary drill for metal drilling comprising a shank portion and cutting inserts with two main cutting edges extending in opposite directions from the axis of the drill and adapted to generate a forwardly tapering frusto conical surface, said main cutting edges being adapted to generate adjacent annular zones of said frusto conical surface which at least touch each other, at the most a minor part of said zones overlapping each other, the drill further having a central secondary cutting edge adapted to generate a rearwardly tapering conical zone, the inner end of said secondary cutting edge extending at least to said axis, all of said cutting edges being rectilinear and situated substantially in the same plane containing said axis, at least the secondary cutting edge having its front surface directed in the same direction as said axis.

6. Drill as defined in claim 5, in which one of said two main cutting edges is composed of two separate cutting edge portions separated by a space, the rotary zone of said space being covered by the rotary zone of the opposite main cutting edge.

7. Drill as defined in claim 5 in which both of said two main cutting edges are composed of at least two separate cutting edge portions which are separated by spaces, the rotary zone of a space in one main cutting edge being covered by the rotary zone of a cutting edge portion in the opposite main cutting edge.

8. Drill as defined in claim 5 in which the cutting edges are situated on inserts of sintered hard metal.

9. Drill as defined in claim 8, in which the inserts are brazed to the drill.

10. Drill as defined in claim 5, in which the secondary cutting edge is situated on the same insert as at least a portion of one of the main cutting edges.

11. Drill as defined in claim 5, in which the cutting edge lengths on both sides of the axis are balanced in relation to each other so that they differ by a small amount sufficient to obtain a suitable lateral pressure.

12. Drill as defined in claim 11, in which the cutting edge lengths on both sides of the axis are practically equal in order to have the lateral pressure small.

13. Drill as defined in claim 5, in which the openings for chip removal in the front of the drill comprise each a major portion of the quadrant in front of each main cutting edge in the direction of rotation.

14. Drill as defined in claim 5, comprising guiding ridges situated outside the quadrant in front of each main cutting edge in the direction of rotation.

15. Drill as defined in claim 5, in which the main cutting edges are situated along the same conical surface, said conical surface having its axis coinciding with the drill axis.

16. Drill as defined in claim 5, in which the secondary cutting edge is parallel with the main cutting edge situated on the opposite side of the axis.

References Cited by the Examiner

UNITED STATES PATENTS 3,014,386  12/1961  Kallio _____ 77—68

FRANCIS S. HUSAR, *Primary Examiner.*